Dec. 5, 1967     P. W. GREUBEL     3,356,030
PLANOGRAPHIC PRINTING METHOD
Filed April 30, 1964
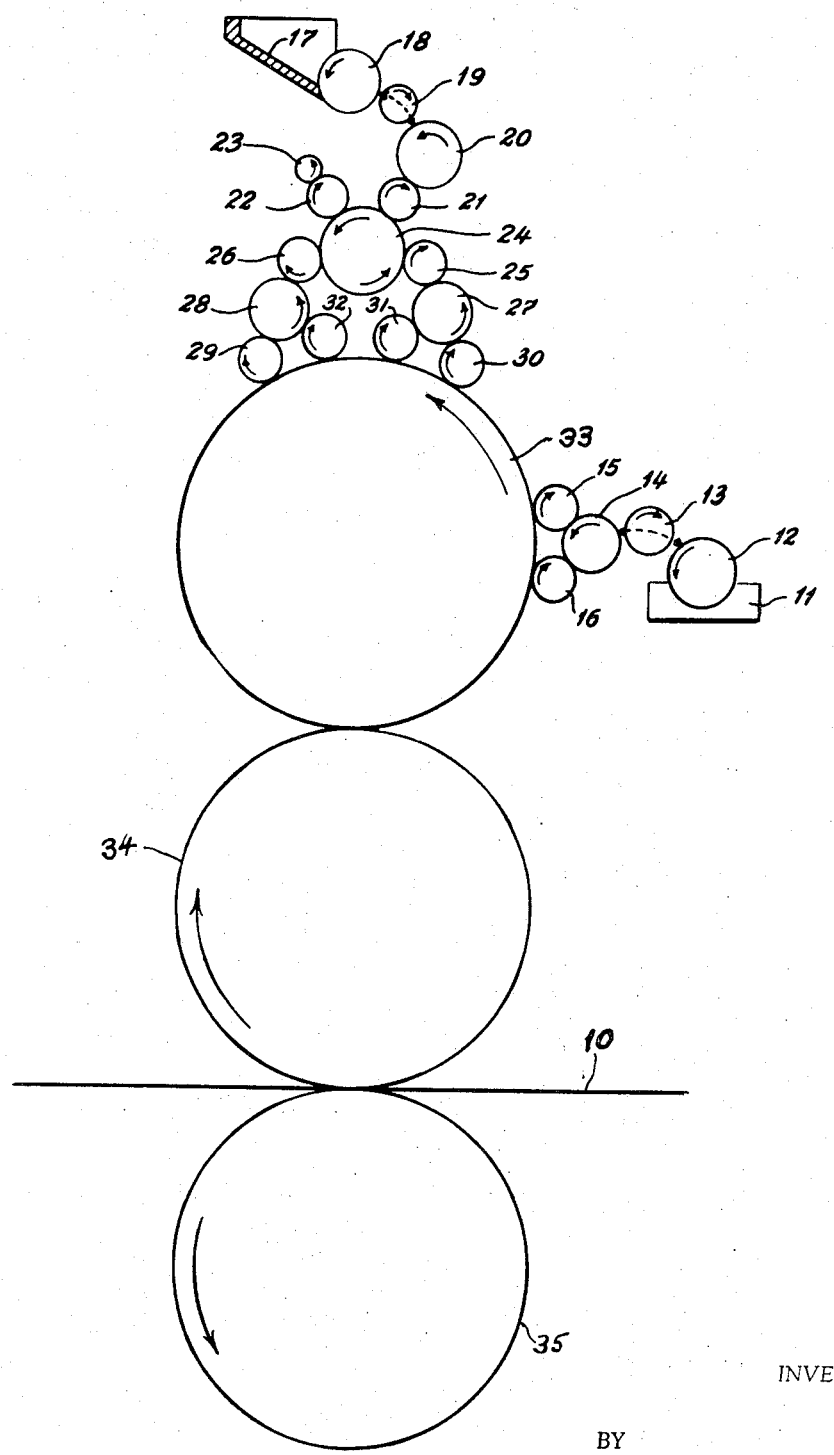
INVENTOR.
BY

3,356,030
PLANOGRAPHIC PRINTING METHOD
Paul W. Greubel, Short Hills, N.J., assignor to Interchemical Corporation, New York, N.Y., a corporation of Ohio
Filed Apr. 30, 1964, Ser. No. 363,756
The portion of the term of the patent subsequent to Jan. 25, 1982, has been disclaimed
9 Claims. (Cl. 101—452)

This invention relates to a new planographic printing process. My copending application S.N. 141,540, filed Sept. 28, 1961, the disclosure of which is hereby incorporated into the present application relates to a new method of planographic printing which does not use the water fountain solution conventionally used in lithographic printing thereby permitting the use of inks other than oil inks, resin-hydrocarbon inks, or oleoresinous inks in planographic printing. The copending application describes a new planographic method of printing permitting the use of substantially odorless non-oily or non-oleoresinous inks. The novel process of this invention is based upon the mutual immiscibility between volatile aliphatic hydrocarbons and odorless non-oily or non-oleoresinous inks, especially inks in which the primary and predominant solvents are either glycols, glycol ethers or glycerine.

I have now discovered that an advantageous method of planographic printing may be achieved by modifying said new method by using inks in which the predominant solvent is water. Preferably, water is essentially the sole solvent.

Because of the very low cost of water as a solvent as well as its non-toxicity and odorlessness, there has been a long standing demand for practical methods of utilizing inks having primarily water solvents in all types of printing including lithographic or planographic printing. No such practical method has been heretofore devised in the planographic printing field.

Except for the use of water-based ink, the procedure in my method is the same as that described in my copending application S.N. 141,540. The same hydrocarbon fountain solution is used; that is an aliphatic hydrocarbon having a boiling range of from 145° F. to 390° F. The hydrocarbon cannot be too volatile since this would cause the solvent applied to the plate to evaporate before the ink is applied. On the other hand, if the hydrocarbon evaporates too slowly it is carried into the ink distribution system and affects the ink. Some commercially available aliphatic hydrocarbons which have been found to be suitable for this process are "Textile Spirits," an aliphatic hydrocarbon having a boiling range of 145°–175° F. and a K.B. value of 32.8 marketed by American Universal Spirits Company, Amsco Supernaphtholite having a boiling range of 247°–287° F. and a K.B. value of 33.8, and "Varnolene" having a boiling range of 310°–390° F. and a K.B. value of 37.4 marketed by Chemical Solvents, Inc.

The present invention also employs the same planographic plate described in said copending application S.N. 141,540; that is a plate in which the non-image areas are rendered retentive of the volatile aliphatic hydrocarbons by a coating of a silicone which covers the non-image areas. Using conventional lithographic equipment, a fountain solution consisting of the volatile aliphatic hydrocarbon is applied to the plate prior to the application of ink. When the ink is subsequently applied, it is prevented from depositing on the non-image areas by the aliphatic hydrocarbon covering such areas and the ink only deposits in the image areas which being exposed metal are preferentially wetted by the ink. The image thus formed is subsequently transferred either directly to the stock being printed, or, as in offset printing, to a rubber blanket from which it is then retransferred to the stock being printed.

This plate comprises a base metal plate suitably made of zinc having a printing surface on which the image areas are the exposed metal and the non-image areas are coated with a cured thermosetting silicone. Other conventional planographic plate metals such as aluminum may also be used for the base metal. The silicones preferably used to coat the non-image areas are thermosetting alkyl and aryl substituted polysiloxanes including curable alkyl siloxanes such as dimethylpolysiloxane resin, thermosetting alkyl-aryl polysiloxanes, for example a methylphenylpolysiloxane having an average degree of substitution of 1.3 methyl and phenyl radicals per silicone atom. Very good results have been achieved with a thermosetting polysiloxane copolymer comprising 37% by weight of dimethylsiloxane units ($(CH_3)_2SiO$), 56% of phenyl siloxane units ($C_6H_5SiO_{1.5}$) and 7% methyl siloxane ($CH_3SiO_{1.5}$).

In order to illustrate the method used in this invention, reference is made to the accompanying drawing which is the conventional lithographic press used in the method of copending application 141,540. Details of press frame, bearings, lubrication, drive, etc. are not shown in this drawing but may be of any of the several well-known suitable types. It is emphasized that there are many different arrangements of the several types of rollers in rotary lithographic presses and that the process of this invention is in no way limited to the schematic arrangement of the drawing. On the contrary, the process of this invention is applicable to any conventional lithographic press. The lithographic press shown has the following parts: paper 10 which is shown as a web, but may be in sheets; a plate cylinder 33, blanket cylinder 34 and impression cylinder 35; a fountain system comprising a fountain 11, fountain roller 12, ductor 13, vibrator 14 and form rollers 15 and 16, and an ink distributing system having ink fountain 17, roller 18, ductor 19, vibrator roller 20, intermediate roller 21, distributor 22 and rider 23, center roller 24, intermediate rollers 25 and 26, drums 27 and 28 and form rollers 29, 30, 31, and 32. Plate cylinder 33 carries the novel lithographic plate. This plate comprises a base metal plate suitably made of zinc having a printing surface on which the image areas are the exposed metal and the non-image areas are coated with a cured thermosetting silicone. Other conventional planographic plate metals such as aluminum may also be used for the base metal.

Now considering the operation of the process of this invention utilizing the lithographic press hereinabove described, the volatile aliphatic hydrocarbon is applied to the plate carried on plate 33 by form rollers 15 and 16 of the fountain system. Subsequent to the application of the aliphatic hydrocarbon, the ink from fountain 17 which has passed through the ink distribution is applied to the plate by form rollers 29 to 32. The hydrocarbon fountain solution which is retained over the silicone coated non-image areas prevents the ink from depositing. The plate having the inked image is then rotated until it is impressed upon the blanket cylinder 34 and has transferred the image thereto. The image is then further transferred to the paper 10 which passes between the blanket cylinder and impression cylinder 35. The plate cylinder then rotates to repeat the process.

In the present specification and claims, unless otherwise set forth, all proportions are by weight.

The inks utilized in the method of this invention may be any of the known inks which have predominantly water solvents. Preferably, water is the sole solvent as in the following ink which is typical of such water-based inks:

Example 1

| | Parts |
|---|---|
| Hydroxyethyl cellulose | 5.3 |
| Water | 75.8 |
| Glyoxal | 2.5 |
| Lignin sulfonate | 3.5 |
| Carbon black | 12.9 |

The above ink formulation gave excellent results when used in the planographic printing method described hereinabove in this specification. Of course, alternative components should be obvious to one skilled in the art. For example, other pigments may be substituted for carbon black. Other bodying agents such as carboxymethyl cellulose, gum arabic, gum karaya and gum tragacanth may be substituted for the hydroxyethyl cellulose. Also other aldehydes particularly dialdehydes such as acrolein dimer may be substituted for the glyoxal. The lignin sulfonate acts as a dispersing agent for the pigment and may be eliminated without appreciably affecting the dispersion of most pigments. In the above ink, the bodying agents act as a binder and the aldehyde acts to cross-link or set the binder. It should be noted that where water-resistance is not essential in the ink the aldehyde component which acts to cross-link the binder may be eliminated.

In addition to inks in which water is essentially the sole solvent, other inks having, in addition to water, a minor amount of a lower alkanol having no more than three carbons such as methanol, ethanol or propanol may be used. Preferably, the lower alkanol constitutes from 5 to 40% and most preferably from 10 to 25% of the total solvent weight. The following are examples of such inks:

Example 2

| | Parts |
|---|---|
| Hydroxyethyl cellulose | 4.5 |
| Water | 63.4 |
| Isopropyl alcohol | 10.0 |
| Glyoxal | 2.4 |
| Lignin sulfonate | 7.8 |
| Carbon black | 12.7 |

The above ink gave the same results as the ink of Example 1 when used in the planographic printing method described above, except that the plate could be cleaned more easily after catch-up. Catch-up usually occurs when the fountain system becomes disengaged from the printing plate causing the plate to become covered with ink.

Example 3

Example 2 is repeated using the same proportions, ingredients and conditions except that ethyl alcohol is substituted for isopropyl alcohol. The results are about equivalent to those of Example 2.

While there have been described what is at present considered to be the preferred embodiments of this invention, it will be obvious to those skilled in the art that various changes and modifications may be made therein without departing from the invention, and it is, therefore, aimed to cover all such changes and modifiactions as fall within the true spirit and scope of the invention.

What is claimed is:

1. A method of planographic printing comprising applying a volatile aliphatic hydrocarbon fountain solution to a lithographic printing plate, the non-image areas of which are covered with a cured coating comprising a thermosetting silicone resin, printing successive copies of the image with an ink having a solvent of which the predominant portion is water, said ink being immiscible with said volatile aliphatic hydrocarbon fountain solution and reapplying said fountain solution between successive printings.

2. The method of claim 1 wherein the solvent in the ink consists essentially of water.

3. The method of claim 1 wherein the solvent in the ink consists essentially of from 10 to 25% of an alkanol having from 1 to 3 carbons and the remainder of water.

4. The method of claim 3 wherein the alkanol is isopropanol.

5. The method of claim 3 wherein the alkanol is ethanol.

6. The method claimed in claim 1 wherein said volatile aliphatic fountain solution has a boiling range within the limits from 145° F. to 390° F.

7. The method of planographic printing defined in claim 1 wherein said thermosetting silicone resin is a polysiloxane comprising at least one monomer selected from the group consisting of alkyl siloxanes and aryl siloxanes.

8. The method defined in claim 7 wherein said thermosetting polysiloxane is methylphenylpolysiloxane.

9. The method defined in claim 7 wherein said thermosetting polysiloxane comprises dimethyl polysiloxane.

References Cited

UNITED STATES PATENTS

| 1,669,416 | 5/1928 | Huebner | 101—149.2 |
| 2,288,073 | 6/1942 | Davis et al. | |
| 2,804,388 | 8/1957 | Marron et al. | |
| 3,167,005 | 1/1965 | Greubel | 101—149.2 |

OTHER REFERENCES

Greubel, Paul W., Can Lithography Be Reversed? In Modern Lithography, vol. 31, November 1963, pp. 35–36.

Hartsuch, Paul J., Chemistry of Lithography. N.Y. Lithographic Technical Foundation, 1961, pp. 301–302.

ROBERT E. PULFREY, *Primary Examiner.*

DAVID KLEIN, *Examiner.*

J. A. BELL, *Assistant Examiner.*